(12) United States Patent
Eves et al.

(10) Patent No.: US 8,176,206 B2
(45) Date of Patent: May 8, 2012

(54) SYSTEM AND METHOD FOR DELIVERING MODIFIED CONENT

(75) Inventors: David A. Eves, Crawley (GB); Richard S. Cole, Redhill (GB)

(73) Assignee: AMBX UK Limited, Surrey (GB)

(*) Notice: Subject to any disclaimer, the term of this patent is extended or adjusted under 35 U.S.C. 154(b) by 1530 days.

(21) Appl. No.: 10/319,873

(22) Filed: Dec. 13, 2002

(65) Prior Publication Data
US 2003/0115180 A1 Jun. 19, 2003

(30) Foreign Application Priority Data

Dec. 19, 2001 (GB) .................................. 0130248.8

(51) Int. Cl.
G06F 15/16 (2006.01)
(52) U.S. Cl. ....................................... 709/250; 709/230
(58) Field of Classification Search .................. 709/250, 709/230
See application file for complete search history.

(56) References Cited

U.S. PATENT DOCUMENTS

| 6,085,229 | A | 7/2000 | Newman et al. | 709/203 |
| 6,122,657 | A | 9/2000 | Hoffman, Jr. et al. | 709/201 |
| 6,185,625 | B1 | 2/2001 | Tso et al. | 709/147 |
| 6,226,642 | B1 | 5/2001 | Beranek et al. | 709/203 |
| 6,510,458 | B1 * | 1/2003 | Berstis et al. | 709/219 |
| 6,615,266 | B1 * | 9/2003 | Hoffman et al. | 709/227 |
| 6,742,047 | B1 * | 5/2004 | Tso | 709/246 |

FOREIGN PATENT DOCUMENTS
EP 1039396 9/2000
* cited by examiner

Primary Examiner — Mohamed Wasel
(74) Attorney, Agent, or Firm — Burns & Levinson LLP; Bruce D. Jobse, Esq.

(57) ABSTRACT

A method of delivering content comprises receiving content in the form of an instruction set of a markup language, distorting the content according to predetermined parameters, and rendering the content. Apparatus for delivering the content are also disclosed.

13 Claims, 1 Drawing Sheet

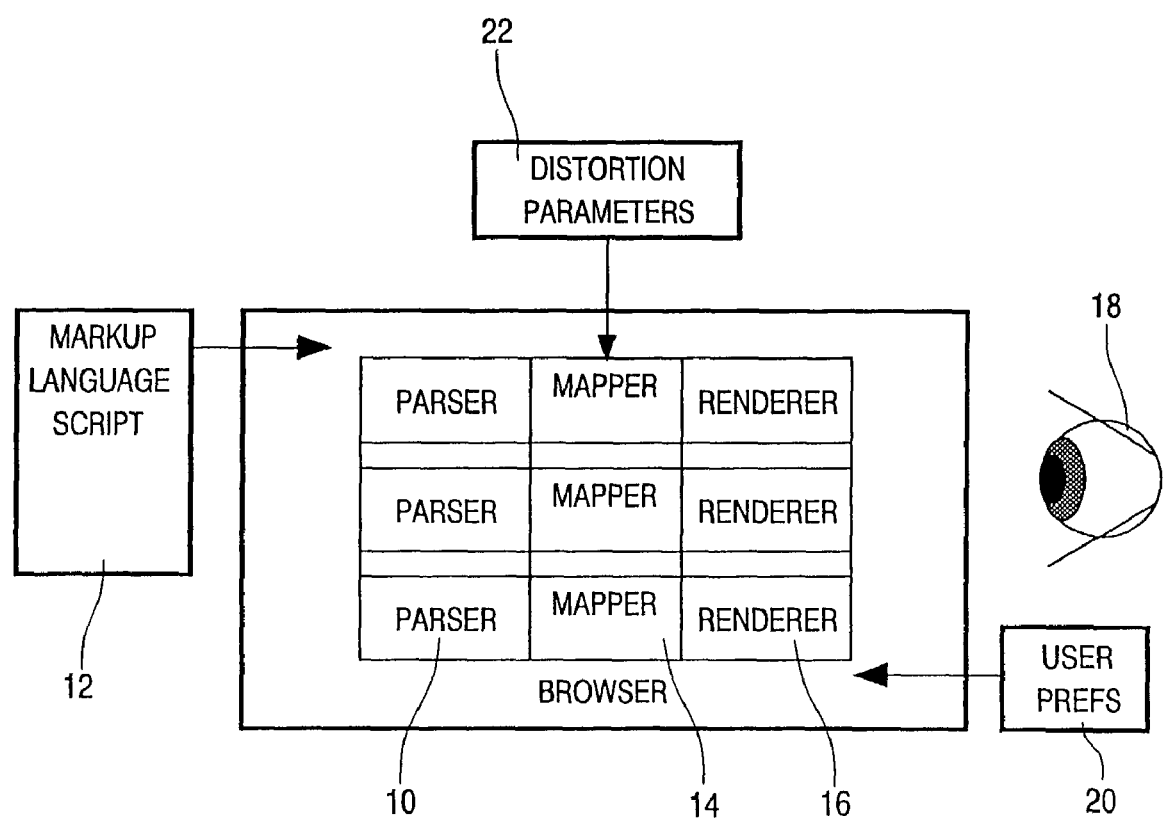

SYSTEM AND METHOD FOR DELIVERING MODIFIED CONENT

BACKGROUND OF THE INVENTION

This invention relates to a method of and apparatus for delivering content. In particular, it relates to the receiving of said content in the form of an instruction set of a markup language and distorting said content.

U.S. Pat. No. 6,185,625 discloses a system for enhancing data access over a communication link. The system for retrieving an object over a computer network includes a network client with a browser for rendering an object to a user and a user interface enabling the user to establish an encoding preference. A remote scaling server retrieves objects and encodes them according to the user specified encoding preference. The disclosed system thus enables users to dynamically influence the trade-off between quality of content and download speed. However, this system does not in any way distort the content, but simply allows the user to achieve a faster speed of data download by the well-known principle of compression through selective scaling of the data.

U.S. Pat. No. 6,122,657 discloses an Internet computer system with methods for dynamic filtering of hypertext tags and content. The system includes one or more web clients, each operating a web browser with an Internet connection to one or more web servers. Each client includes, interposed between its browser and communication layer, a filter module that traps and processes all communication between the browser and the communication layer. Again the application relates to methods for speeding up the process of browsing web content in a computer system having an Internet or other on-line browser. The system does not in any way distort the content.

Browsers usually aim to render the content to reflect the intentions of the author. This may not suit the requirements and interest of the end user.

It is therefore an object of the invention to provide an improved method of and apparatus for delivering content.

BRIEF SUMMARY OF THE INVENTION

According to a first aspect of the invention, there is provided a method of delivering content comprising receiving content in the form of an instruction set of a markup language, distorting said content according to predetermined parameters, and rendering said content.

According to a second aspect of the invention, there is provided apparatus for delivering content comprising receiving means for receiving content in the form of an instruction set of a markup language, distorting means for distorting said content according to predetermined parameters, and rendering means for rendering said content.

Owing to the invention, it is possible to deliver content that is distorted according to predetermined parameters. In this way a user can distort the content that they receive, to suit their mood or stylistic preferences.

Preferably, the rendering is by a browser distributed amongst a set of devices, and the content comprises data to be physically rendered. The predetermined parameters may be selected by a user, advantageously from a predefined list of generic expressions. The distorting is preferably either based upon a particular stylistic form or upon a set of personal preferences.

BRIEF DESCRIPTION OF THE DRAWINGS

Embodiments of the invention will now be described, by way of example only, with reference to the accompanying drawings, in which:

FIG. 1 is a schematic representation of apparatus for delivering content.

DETAILED DESCRIPTION OF THE INVENTION

In the FIGURE, the apparatus comprises receiving means 10 for receiving content in the form of an instruction set 12 of a markup language. The apparatus also includes distorting means 14 for distorting the content according to predetermined parameters 22, and rendering means 16 for rendering the content.

In this embodiment, the language used is a language that gives high level descriptions of data to be physically rendered. For example, the instruction set 12 may comprise <FOREST>, <AUTUMN>, <WARM WEATHER>. This information is rendered by the rendering means 16, which is part of a browser distributed amongst a set of devices. This set of networked devices could be, for example, a television, audio equipment, a personal computer etc. and together the set of devices combine to create the effect described in the content 12. Each device provides elements towards the overall environment according to its functionality.

In an alternative embodiment, the rendering means is part of a single device, and converts the instruction set 12 into a number of device specific commands that are then communicated to those devices to create the external environment as described in the content 12.

The browser is deliberately designed to deliver the content 12 in a distorted form. For example, the distorting means 14 may distort the content based upon a particular stylistic form, e.g. cartoon exaggerated, film noir etc. Alternatively, the distortion may be based upon a set of user preferences, e.g. keep the noise down, more special effects please, make it jolly I'm depressed etc.

When dealing with content 12 that affects the environment around a user 18, rather than just on a screen, it is more important that all content 12 is rendered in a way that fits and matches the sensibilities of the user 18. The predetermined parameters 22 for distorting the content 12 are selected by the user 18. This input from the user 18 is shown schematically at 20 in the FIGURE. The user can select the predetermined parameters 22 from a list of generic expressions, for example, peaceful, moody, etc.

Therefore the user 18 has control over certain aspects of the content 12 that is delivered to them. In this way, for example, when a user 18 is watching a film, it may be provided with augmented data in the form of an instruction set of a markup language. The user 18 can select distortion of the augmented effects to reflect their mood or to choose a particular style that would compliment or contrast with the film.

The browser alters the mapping according to the distortion parameters 22. For example, if the original instruction set 12 included the term <LOUD>, and the user 18 has selected a preference for "keep the noise down", the mapping of <LOUD> would be altered so that the original volume level of, say, 8 will be reduced to 4. Essentially the same content is realised differently depending on the mapping modifiers.

Alternative and well-known languages can be used. The markup language could be, for example, HTML (Hyper Text Markup Language) or VRML (Virtual Reality Modelling Language).

What is claimed is:

1. A method of customizing an external environment physically rendered in association with content comprising:
   providing a set of networked user devices, each device providing elements toward an external environment according to its respective functionality;

receiving content at one of the set of networked user devices, the content in the form of an instruction set of a markup language and defining high level descriptions of data to be physically rendered;

distorting, with an interpreter program, the instruction set comprising said content according to user-selectable predetermined parameters;

converting the distorted instruction set into device specific commands; and communicating the device specific commands to one or more different of the set of networked user devices, via a network; and operating the one or more different devices in the set of networked user devices to create an external environment described in the content.

2. The method according to claim 1, wherein said method is performed by a browser distributed amongst the set of devices.

3. The method according to claim 1, wherein said method is performed by a browser stored on a single device.

4. The method according to claim 1, wherein said content comprises data to be physically rendered.

5. The method according to claim 1, wherein said predetermined parameters are selected by a user.

6. The method according to claim 5, wherein said predetermined parameters are selected by a user from a predefined list of generic expressions.

7. The method according to claim 1, wherein said distorting is based upon a particular stylistic form.

8. The method according to claim 1, wherein said distorting is based upon a set of personal preferences.

9. An apparatus for creating an external environment with a set of networked devices comprising:

a set of networked user devices, each device providing elements toward an external environment according to its respective functionality:

receiving means in one of the set of networked user devices for receiving content in the form of an instruction set of a markup language and defining high level descriptions of data to be physically rendered;

interpreter means in one of the set of networked devices for distorting said content according to user-selectable predetermined parameters;

converting means for converting the distorted instruction set into device specific commands; and means for communicating the device specific commands to one or more different of the plurality of networked user devices, via a network, and for operating the one or more different devices in the set of networked user devices to create an external environment described in the content.

10. The apparatus according to claim 9, wherein said converting means is distributed amongst a set of devices.

11. The apparatus according to claim 9, wherein said converting means is part of a single device.

12. A method for customizing an external environment physically rendered in association with content comprising:

receiving a user definable distortion parameter associated with one of a particular stylistic form and set of personal preferences;

receiving content at one of a set of networked user devices, the content in the form of an instruction set of a markup language;

distorting said content, with a interpreter program, according to the distortion parameter;

converting the distorted content instruction set into device specific commands for one or more different of the set of networked user devices, such device specific commands collectively defining an external environment associated with the received user definable distortion parameter;

communicating the converted device specific commands to the one or more different of the set of networked user devices, via a network; and physically rendering, with the set of networked user devices, the external environment associated with the particular stylistic form or set of personal preferences identified in the user definable distortion parameter, in conjunction with the received content.

13. The method according to claim 12, wherein distorting said content according to the distortion parameter comprises mapping the at least one received markup language instruction to a value associated with the distortion parameter.

* * * * *